United States Patent [19]

Jansson

[11] 4,150,426
[45] Apr. 17, 1979

[54] TRANSISTORIZED POWER SUPPLY DRIVE CIRCUIT ARRANGEMENT

[75] Inventor: Leonard E. Jansson, Surrey, England

[73] Assignee: U.S. Philips Corporation, New York, N.Y.

[21] Appl. No.: 854,116

[22] Filed: Nov. 23, 1977

[30] Foreign Application Priority Data

Nov. 29, 1976 [GB] United Kingdom ............... 49633/76

[51] Int. Cl.² .......................................... H02M 7/537
[52] U.S. Cl. ......................................... 363/97; 363/25
[58] Field of Search ....................... 363/24, 25, 26, 97, 363/133, 134

[56] References Cited

U.S. PATENT DOCUMENTS 3,657,631  4/1972  Martens et al. ...................... 363/26
3,737,756  6/1973  Hasley et al. ......................... 363/21

*Primary Examiner*—William M. Shoop
*Attorney, Agent, or Firm*—Bernard Franzblau

[57] ABSTRACT

In a switched mode power supply of the push-pull type the drive to each output transistor is terminated just after its collector current reaches the value which the collector current of the other transistor had when the drive thereto was removed in the immediately preceding conduction period, in order to substantially equalize the drive to the output transformer contributed by each output transistor. This is done by means of sampling and storage circuits which store signals representative of the values of the collector currents in the two output transistors which occur when their drive is removed in combination with a comparison circuit which compares each stored value with the collector current of that transistor which conducts during the next conduction period.

6 Claims, 4 Drawing Figures

TRANSISTORIZED POWER SUPPLY DRIVE CIRCUIT ARRANGEMENT

This invention relates to a current-balancing circuit for a direct-voltage converter of the push-pull type the primary side of which is alternately connected to a direct voltage source by means of at least two transistors so that an alternating voltage is obtained on the secondary side. The converter also includes a drive circuit alternately driving the transistors into conduction in a pulsating fashion and a current measuring device connected in series with the main current path of the transistors, to which a comparison circuit is connected, which supplies a correction signal to the drive circuit in the case of inequality of the current in the main current paths in a manner so as to eliminate said inequality.

A power supply circuit of this kind may be used, for example, as a power inverter for applying alternating current to apparatus where only a d.c. supply is available or, by full-wave rectification of an output from the transformer, as a d.c.-d.c. converter for supplying apparatus with d.c. current at a voltage level which is different from and/or stabilised with respect to an input supply. It is usual with known such circuits to stabilize an output voltage derived therefrom by comparing said output voltage with a reference, thereby producing an error signal. This error signal is fed back to the switching signal source and used to adjust the duration of each drive period of each transistor, and thus the duration of each conduction period of the main current paths thereof, in a sense such as to reduce the error signal.

It is known that, with such a circuit, any imbalance between the conduction periods of the two transistors and/or between the bottoming voltages across the main current paths thereof is liable to result in saturation of the transformer core, which in turn may result in destruction of the transistors. Such an imbalance in the conduction periods may be caused, when the circuit output is stabilized in the manner outlined above, by a rapid change of load current or by interference pick-up or instability in the feedback loop. This latter possibility applies even when the circuit is of the so-called "single-ended push-pull" type in which the build up of a d.c. component in the transformer under steady-state operating conditions is prevented by a capacitor included in such circuits in series with the transformer primary winding.

British Patent Specification No. 1,421,797 (corresponding to U.S. Pat. No. 3,870,943) discloses a circuit of the above type in which steps are taken to correct for imbalances which may occur in the conduction periods of the two transistors. In this known circuit, the output voltage of which is stabilised in the manner outlined above, a signal proportional to the current in one transistor and a reverse polarity signal proportional to the current in the other transistor are combined and integrated to produce an error signal in response to any imbalance. This error signal is used to influence the relative durations of the drive signal to the two transistors so as to correct the imbalance. It has been found that such a circuit may fail to prevent transformer saturation and consequently destruction of the transistors if the output voltage stabilizing feedback signal is allowed to vary rapidly so as to produce greatly differing conduction times in the two transistors before the balancing system has time to re-establish balanced operation.

It is an object of the present invention to provide a circuit which does not suffer from this disadvantage.

A current balancing circuit of the said type therefore comprises a comparison circuit, a first and a second sampling and storage circuit, each having a measuring input connected to the current measuring device, a control input connected to the drive circuit and a measuring output connected to the one input of a comparator whose output is connected to the drive circuit, and of which an other input is connected to the current measuring device. During each pulse from the drive circuit, which causes one of the transistors to conduct, the one sampling and storage circuit stores the value of the current through the conducting transistor. The final value of the current in the other transistor upon termination of the preceding pulse from the drive circuit is transferred from the measuring output of the other sampling and storage circuit to the comparator which compares said final value with the said value of the current through the conducting transistor, and terminates the existing pulse when the comparator produces an output signal because the said value of the current is exceeding the said final value.

It has now been recognised that, if the drive to each driver transistor is removed substantially at the instant at which the current in the main current path thereof reaches the value which the current in the main current path of the other said driver transistor had during the immediately preceding conduction period thereof, the occurrence of saturation in the transformer can be at least delayed. If a current limit circuit is also provided to remove the drive to the driver transistors if the current in the main current paths thereof exceeds a certain amount, this delay may be sufficient to allow the current limit circuit to operate satisfactorily in all cases to prevent saturation from occurring in the transformer.

Parasitic capacitances may give rise to substantial current surges when the transistors are turned on. In order to prevent these surges from having an adverse effect on the balancing circuit, it is desirable to render this circuit operative after the turn on transient has decayed.

For this purpose an embodiment of the invention is characterized in that each comparator has a blocking input which is connected to the output of a time delay circuit with a trigger input connected to the drive circuit for blocking the comparator during the beginning of each drive pulse for the transistors. In combination therewith it is generally necessary that the control input of the sampling and storage circuit be connected to the said output of the time delay circuit.

The drive circuit for the transistors and the control loop for the output voltage stabilisation of the converter may be dimensioned so that when the load of the converter is switched off the transistors receive no drive signal during some periods, which could mean that the balancing circuit in accordance with the invention would neither receive any drive signal and the comparators supply incorrect outputs. An embodiment of the invention can prevent this and is characterized in that the control input of the sampling and storage circuit is connected to the output of an OR-gate having a first input connected to the output of the time delay circuit. A second input of the OR-gate is connected to a pulse generator circuit which has a blocking input connected to the said trigger input and a start input which is connected to the clock pulse generator so as to only supply a sampling pulse to the said control input in the absence of the control pulse during a basic pulse. The drive circuit then includes a clock pulse generator which supplies the basic pulses from which the drive pulses for the transistors are derived. Thus, the balancing circuit can still process the information corresponding to the currentless condition in the primary circuit of the converter.

Another embodiment is characterized in that the first and the second sampling and storage circuits each comprise a series connection of a capacitor and a switch which series connection is included across the measuring input. The control electrode of the switch is the respective control input and the junction point of the switch and capacitor is the respective measuring output. Furthermore the measuring inputs are connected in parallel with each other and to a common current measuring device and one common comparator comprises a differential amplifier and two further switches. The output of the amplifier is connected to the control input, the one input being connected to the one terminal of each of the two switches, the other terminal of each being connected to a said measuring output, and the control electrode of each is connected to a respective blocking input. Furthermore the further input of the amplifier is connected to the common line which connects the measuring inputs and to which moreover the first mentioned switches are connected.

In this respect it is found to be advantageous that a very simple design with few components is obtained.

When moreover the voltage on the storage elements is clamped by a clamping circuit it is also possible to obtain an excess current protection for the transistors in the converter circuit.

For this another embodiment is characterized in that each measuring output is connected to a reference potential through a clamping diode, which potential corresponds to a maximum permissible current in the transistors.

The invention will now be described by way of example, with reference to the accompanying drawing, in which.

Figure 1:
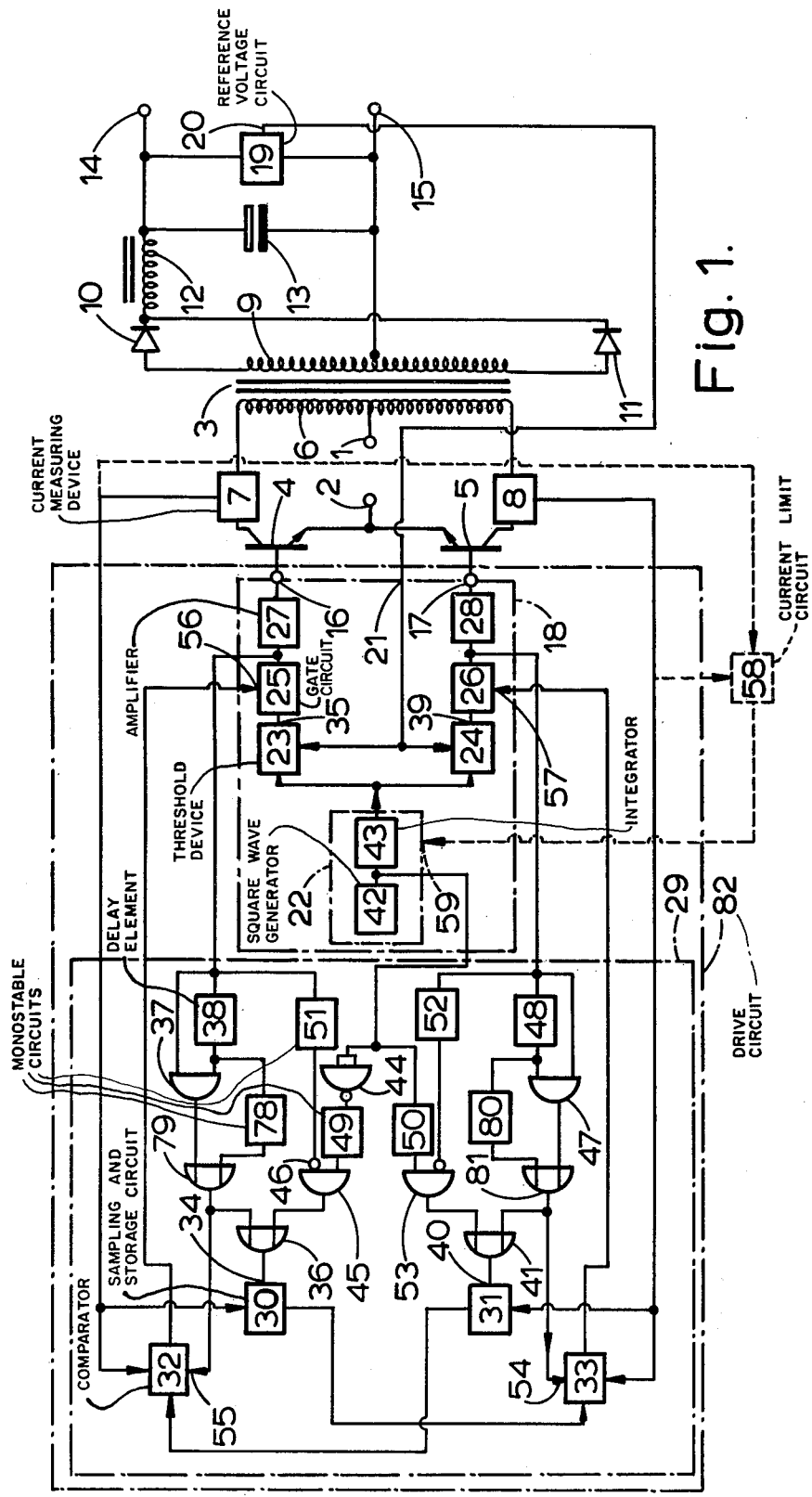
FIG. 1 is a simplified circuit diagram of the invention.

In FIG. 1 a transistorized power supply circuit arrangement comprises a pair of d.c. input terminals 1 and 2 respectively, a transformer 3 having a core of magnetizable material and first and second driver transistors 4 and 5 for said transformer. The main (emitter-collector) current path of transistor 4 forms a series combination with one half of a centre-tapped primary winding 6 of transformer 3 via an impedance 7. Similarly the main current path of transistor 5 forms a series combination with the other half of winding 6 via an impedance 8. Said series combinations are each included in a circuit extending between terminal 1 and terminal 2 in such a sense that, when a positive potential is applied to terminal 1 relative to terminal 2 and transistor 4 is caused to conduct, a voltage will be set up across secondary winding 9 of transformer 3 with the opposite polarity to that set up thereacross when transistor 5 is caused to conduct (because the primary winding 6 is effectively connected in opposite senses with respect to the two transistors). Centre-tapped secondary winding 9 feeds output terminals 14, 15 via a conventional fullwave rectifier and smoothing circuit comprising diodes 10 and 11, choke 12, and smoothing capacitor 13.

The control (base) electrodes of transistors 4 and 5 are fed from output terminals 16 and 17 respectively of a switching signal source 18, which supplies drive current pulses to said control electrodes alternately. These drive current pulses are of substantially fixed frequency and their mark-to-space ratio is controlled by the voltage appearing in operation across output terminals 14 and 15 which is compared with a reference voltage in a circuit 19. Any deviation of the voltage across terminals 14 and 15 from the desired value results in an error signal appearing on output 20 of circuit 19, which error signal is fed to a control input 21 of source 18 to adjust said mark-to space ratio in such a sense as to reduce the error. To this end source 18 comprises a triangular wave generator 22 in the form of a square-wave generator 42 feeding an integrator 43. The output of integrator 43 is fed to threshold devices 23 and 24. Threshold device 23 produces an output if and only if the instantaneous value of the triangular signal fed thereto is above a first threshold value, and threshold device 24 produces an output if and only if the instantaneous value of the triangular signal fed thereto is below a second threshold value, said threshold values being symmetrical about the mean value of the triangular signal. The separation between the two threshold values is controlled by the error signal fed to terminal 21. If the voltage across terminals 14 and 15 is too high the separation is increased, thereby reducing the mark-to-space ratio of the output pulses produced by devices 23 and 24, and conversely. The output pulses from devices 23 and 24 are fed via normally transmissive gates 25 and 26 respectively to the inputs of amplifiers 27 and 28 respectively, the outputs of which supply the terminals 16 and 17 respectively and hence the base electrodes of the transistors 4 and 5 respectively.

The arrangement also includes a sampling and comparison circuit 29 for sampling and storing the value of the steadily increasing current (if present) in the emitter-collector path of each transistor 4 and 5 during each conduction period of the corresponding transistor at the instant when the drive to the corresponding transistor is removed and comparing the stored value with the steadily increasing current (if present) in the emitter-collector path of the other said transistor during the next conduction period of said other transistor. Circuit 29, which together with source 18 forms a drive circuit arrangement 82 for the transistors 4 and 5 together with transformer 3, comprises a pair of sampling and storage circuits 30 and 31 respectively, for sampling the voltages across impedances 7 and 8 respectively, and a comparison circuit comprising a pair of gated comparators 32 and 33 respectively. Sampling signal input 34 of circuit 30 is fed from the output 35 of threshold device 23 (in fact from the output of gate 25) via an OR gate 36, and the combination of an AND gate 37, a delay element 38, a monostable 78 and an OR gate 79, element 38 having a delay period T equal to the duration of the turn-on spike which occurs in the collector current of transistor 4 (and transistor 5) when the corresponding transistor is turned on (which spike is due to the charging of the parasitic capacitance in its collector circuit). Monostable 78 is constructed so that the duration of the triggered state thereof is appreciably shorter than the duration of said turn-on-spike. Thus a sampling signal pulse is applied to input 34 of circuit 30 each time an output pulse is produced by threshold device 23. If the duration of this output pulse is longer than T plus the duration of the triggered state of monostable 78, the leading edge of this sampling signal pulse will occur in time T after the leading edge of the pulse produced by device 23 and conducted through gate 25, and the trailing edge of this sampling signal pulse will coincide with the trailing edge of the pulse conducted through gate 25 i.e. with the instant at which the drive to transistor 4 is removed. If the duration of the output pulse of gate 25 is shorter than T plus the duration of the triggered state of monostable 78 a sampling signal pulse will still be applied to input 34 of circuit 30. Although its leading edge will still occur in time T after the leading edge of the pulse produced by device 23 its duration will now be the (short) duration of the triggered state of monostable 78. Similarly sampling signal input 40 of circuit 31 is fed from the output 39 of threshold device 24 (in fact from the output of gate 26) via an OR gate 41 and the combination of an AND gate 47, a delay element 48, a monostable 80 and an OR gate 81, element 48 having the same delay period T as element 38 and monostable 80 having the same triggered state duration as monostable 78. Thus a sampling signal pulse is applied to input 40 of circuit 31 each time an output pulse is produced by threshold device 24. If the duration of this output pulse is longer than T plus the duration of the triggered state of monostable 80, the leading edge of this sampling signal pulse will occur a time T after the leading edge of the pulse produced by device 24 and conducted through gate 26, and the trailing edge of this sampling pulse will coincide with the trailing edge of the pulse conducted through gate 26, i.e. with the instant at which the drive to transistor 5 is removed. If the duration of the output pulse of gate 26 is shorter than T plus the duration of the triggered state of monostable 80 a sampling signal pulse will still be applied to input 40 of circuit 31. Although its leading edge will still occur a time T after the leading edge of the pulse produced by device 24 its duration will now be the (short) duration of the triggered state of monostable 80.

OR gate 36 is also fed from the output of generator 42 via an inverter 44, a monostable 49, and a further gate 45 an inhibit input 46 of which is coupled to the output of gate 25 via a monostable 51. The leading and trailing edges of the square-wave output from generator 42 coincide with the starts of the positive-going and negative-going excursions respectively of the output from integrator 43, i.e. with the centres of the output pulses (if present) from threshold devices 24 and 23 respectively. Thus monostable 49 is triggered at the centre of each output pulse from threshold device 23 and also at times corresponding thereto even if device 23 should not in fact produce a pulse (this being the situation if the feedback from circuit 19 should cause the threshold of device 23 to be raised so far that one or more output pulses from 23 is missed altogether). Monostable 49 is constructed so that the duration of the triggered state thereof is a small fraction, for example between one hundredth and one tenth, of the period of the output of generator 42, and monostable 51 is constructed so that the duration of the triggered state thereof is just longer than half the maximum possible duration of an output pulse from circuit 23 plus the duration of the triggered state of monostable 49. Gate 45 therefore applies a sampling signal pulse to the input 34 of circuit 30 via gate 36 at times corresponding to the centres of the output pulses from device 23 if and only if the corresponding output pulse from device 23 is missed completely. The duration of this sampling signal pulse is determined by the duration of the triggered state of monostable 49, and it is generated so that sampling and storage circuit 30 should produce an output (equal to zero) even if an output pulse from device 23 is missed completely.

Components 50, 52, and 53 corresponding to components 49, 51, and 45 respectively are also provided coupling the outputs of generator 42 and gate 26 in a similar manner to the sampling signal input 40 of circuit 31 via OR gate 41 so that circuit 31 is supplied with a sampling signal pulse from gate 53 at times corresponding to the centres of the output pulses from device 24 if and only if the corresponding output pulse from device 24 is missed completely. The input of monostable 50 is coupled to the output of generator 42 directly in this case because it is required that monostable 50 be triggered by the leading edges of the output from generator 42, rather than the trailing edges which trigger monostable 49.

It will be seen that circuit 30 samples and stores the value of the voltage appearing across impedance 7, i.e. the value of the collector current of transistor 4, at each instant that the drive to transistor 4 is cut off, provided that transistor 4 is driven for periods longer than the duration of the turn-on spikes in the collector current thereof. If the drive is shorter than this it samples and stores the value of the voltage (if any) appearing across impedance 7 just after the turn-on spikes have been terminated. Moreover circuit 30 also samples and stores the (zero) value of the voltage appearing across impedance 7 at times corresponding to the centres of the drive pulses applied to transistor 4 if such drive pulses should in fact be missed. Sampling and storage circuit 31 operates in a similar way with respect to impedance 8 and transistor 5.

The outputs of sampling and storage circuits 30 and 31 are applied to second comparison signal inputs of the comparators 33 and 32 respectively, first comparison signal inputs of which are connected to the impedances 8 and 7 respectively. Each comparator is constructed to produce an output when the value of a signal at its second input just exceeds the value of a signal at its first input, provided that the comparator is gated "on". Gating signal input 54 of comparator 33 is coupled to the output of gate 81, and gating signal input 55 of comparator 32 is coupled to the output of gate 79. Comparator 32 is therefore operative from a time T after each drive pulse is applied to transistor 4 until the time when the corresponding drive pulse is removed or until monostable 78 resets whichever is later and comparator 33 is similarly operative from a time T after each drive pulse is applied to transistor 5 until the time when the corresponding pulse is removed, or until monostable 80 resets, whichever is later. Thus each time transistor 4 conducts the comparator 32 compares the value (derived from impedance 7) of the collector current thereof which occur after the turn-on spike, i.e. when the collector current is increasing steadily, with the value which the steadily increasing collector current of transistor 5 had (if any) when the drive to transistor 5 was removed in the preceding conduction period of transistor 5, which value is stored in circuit 31. If the steadily increasing collector current of transistor 4 should become just greater than the value stored in circuit 31 comparator 32 produces an output which is fed to the gating signal input 56 of gate 25, blocking this gate and thereby removing the drive from transistor 4 (if still present). Similarly each time transistor 5 conducts the comparator 33 compares the values (derived from impedance 8) of the collector current thereof which occur after the turn-on spike, i.e. when the collector current is increasing steadily, with the value which the steadily increasing collector current of transistor 4 had (if any) when the drive to transistor 4 was removed in the preceding conduction period of transistor 4, which value is stored in circuit 30. If the steadily increasing collector current of transistor 5 should become just greater than the value stored in circuit 30 comparator 33 produces an output which is fed to the gating signal input 57 of gate 26, blocking this gate and thereby removing the drive from transistor 5 (if still present). In this way the drive to each transistor is removed if the steadily increasing collector current therein exceeds by more than a small amount the value which the steadily increasing collector current of the other transistor had (if any) when its drive was removed in the immediately preceding conduction period, thereby ensuring that transformer 3 is driven in opposite senses by substantially the same amount during successive conduction periods of the transistors 4 and 5. Gates 25 and 26 are constructed so that, once they have been blocked, they remain in that state until the leading edge of the next output pulse is received from the corresponding threshold circuit 23 or 24. They may each be constructed in known manner from a pair of cross-coupled logic gates. It will be evident that the gating signals for comparators 32 and 33 could, if desired, be derived from the inputs to gates 25 and 26 respectively, rather than from the outputs thereof.

It should be noted that each comparator 32 and 33 must be constructed to produce an output only when the signal at the first input thereof exceeds that at the second input (although only by a small amount). If the comparator were to produce an output when the two signals are equal it would be impossible for the conduction periods of the two transistors to be increased to take account, for example, of an increased demand at the output terminals 14 and 15 because the effective drive applied to the transformer 3 during each conduction period would then be made exactly equal to the effective drive during the preceding conduction period. Because of this it should be noted that, unless further steps are taken, it is possible during continuous operation for the symmetrical component of the magnetizing current in transformer 3 to increase by an unlimited amount and, especially if a small transformer 3 is used, this may still result eventually in saturation of the transformer core. Because of this a current limit circuit (which may be conventional) is preferably also provided to remove the drive to the transistors 4 and 5 if the collector current of either, or the component thereof which corresponds to magnetization of the transformer 3, should exceed a predetermined amount. The balancing circuit shown can increase the time available for such a current limit circuit to operate before the situation becomes irretrievable, thereby increasing the effectiveness thereof. A current limit circuit which may be used for this purpose is described and claimed in copending U.S. Pat. application No. 788,799 the subject matter of which is incorporated herein by reference. It is shown diagrammatically in FIG. 1 as a block 58 having collector current sensing inputs connected to impedances 7 and 8 and an output coupled to a blocking input 59 of triangular wave generator 22.

If d.c. isolation is not required between the primary and secondary of transformer 3 impedances 7 and 8 may be constituted by low-value resistors the voltages across which are applied to components 30, 32 and 58, and to components 31, 33 and 58 respectively, or they may, as a modulation, even be combined as a single low-value resistor in series with terminal 1 or terminal 2, the voltage across which is fed to both sets of components. On the other hand if such d.c. isolation is required impedances 7 and 8 may be constituted by current transformers the primary of each of which is connected in series with the collector of the corresponding transistor and the secondary of each of which is connected to a resistive load the voltage across which is supplied to the corresponding set of components. In the latter case amplifiers 27 and 28 should of course supply the bases of the transistors 4 and 5 respectively via isolating transformers.

It is not essential that the sampling and storage circuits 30 and 31 sample and store the value of the steadily increasing corresponding collector current occurring exactly at the instant when the drive to the corresponding transistor is removed, it merely being necessary that the value of the steadily increasing collector current at said instant be predictable from the sampled value. Thus if the behaviour of the collector current of each transistor around the time that the drive thereto is removed is predictable, then the circuits 30 and 31 may, for example, sample and store the value which the corresponding steadily increasing collector current attains a small predetermined time after the drive to the corresponding transistor is removed (when the transistor is still conducting due to charges stored in the base region thereof). If this is done then, of course, the output of the circuit 30 or 31 should be correct for the change in collector current which occurs during said small predetermined time.

Although transistors 4 and 5 are shown connected to transformer 3 in a conventional double-ended push-pull configuration it will be apparent that, as an alternative, they may be connected in a single-ended push-pull configuration, i.e. a configuration in which the centre tap of the primary of transformer 3 is omitted, in which one end of the transformer primary is connected to the common point of a pair of capacitors connected in series across terminals 1 and 2, and in which the collector-emitter paths of transistors 4 and 5 are connected in series in the same sense across terminals 1 and 2. The other end of the transformer primary is then connected to the common point of the emitter of one transistor and the collector of the other. In such a case the impedances 7 and 8 should be connected immediately in series with the collectors of the corresponding transistors.

Although transistors 4 and 5 have been shown as bipolar transistors it will be evident that alternatively they may comprise, for example, power field-effect transistors.

Because the comparators 32 and 33 operate alternately they may be replaced by a single comparison circuit gated by the output of both gates 79 and 81. If this is done the first comparison input of the single comparator should be fed from the outputs of both impedances 7 and 8 (or by the output of a single impedance included in the common supply to the collectors of transistors 4 and 5 if 7 and 8 are replaced thereby) and the second comparison signal input of the single comparator should be fed from the outputs of circuits 30 and 31 via individual switches switched so that the switch in the output of circuit 30 is blocked when an output pulse appears at terminal 16, and the switch in the output of circuit 31 is blocked when an output pulse appears at terminal 17. To this end the switching inputs of the two switches may be coupled to the outputs of gates 41 and 36 respectively.

Figure 2:
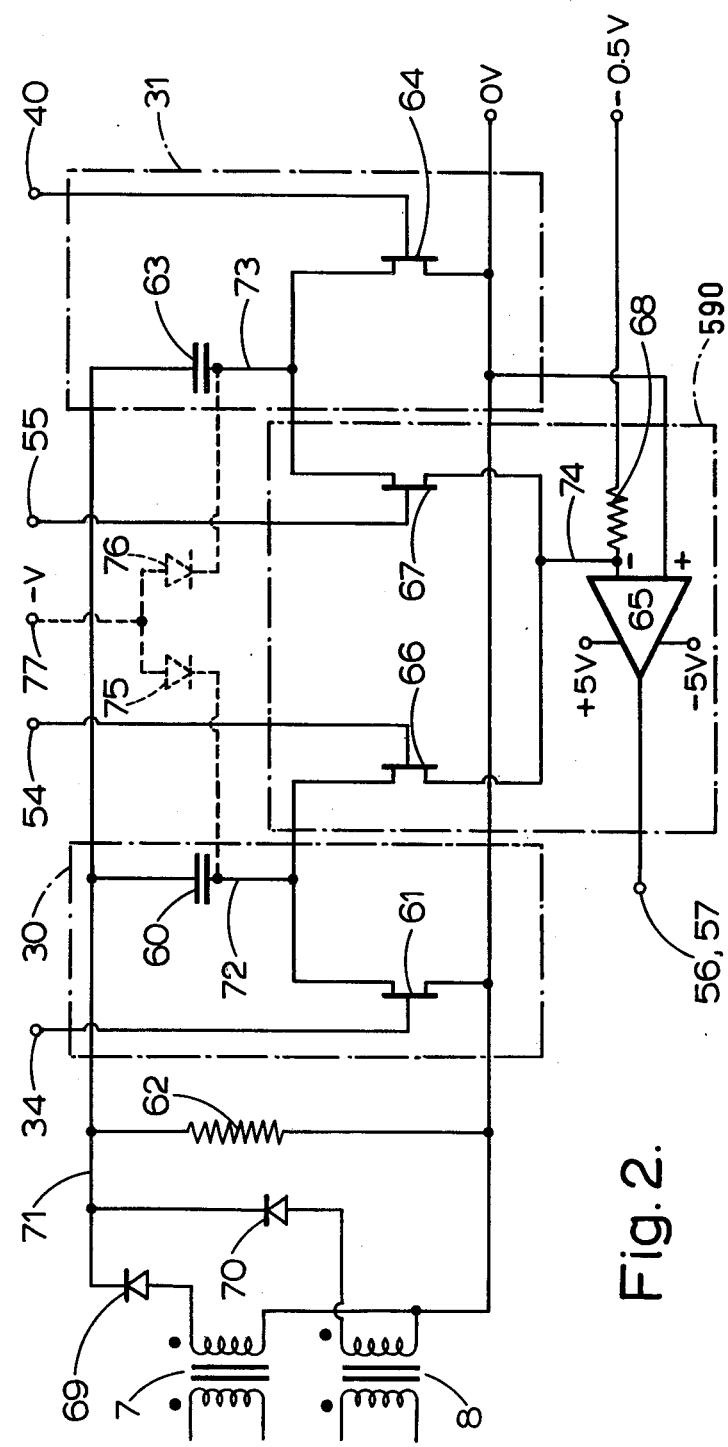
FIG. 2 shows a modified part of the circuit of FIG. 1 in more detail.

FIG. 2 shows another possible construction for the components 30-33 of FIG. 1, in which the two gated comparators 32 and 33 have been replaced by a single comparator 65 included in a circuit 590. The sampling and storage circuit 30 of FIG. 1 is constituted by the series combination of a storage capacitor 60 and a switch 61 connected across a resistor 62, and the sampling and storage circuit 31 of FIG. 1 is constituted by the series combination of a storage capacitor 63 and a switch 64 also connected across the resistor 62. Comparator 65 is in the form of an operational amplifier, a pair of switches 66 and 67 connecting its inverting input to the common point of capacitor 60 and switch 61 and to the common point of capacitor 63 and switch 64 respectively. The non-inverting input of amplifier 65 is connected to the zero-volt line, as is the lower end of resistor 62. The inverting input of amplifier 65 is also connected to a small negative potential of, for example, −0.5 V via a high-value resistor 68. The impedances 7 and 8 of FIG. 1 are shown constituted by current transformers the primaries of which are included in the collector circuits of the transistors 4 and 5 respectively and the secondaries of which are both connected to resistor 62 via diodes 69 and 70 respectively.

Figure 3:
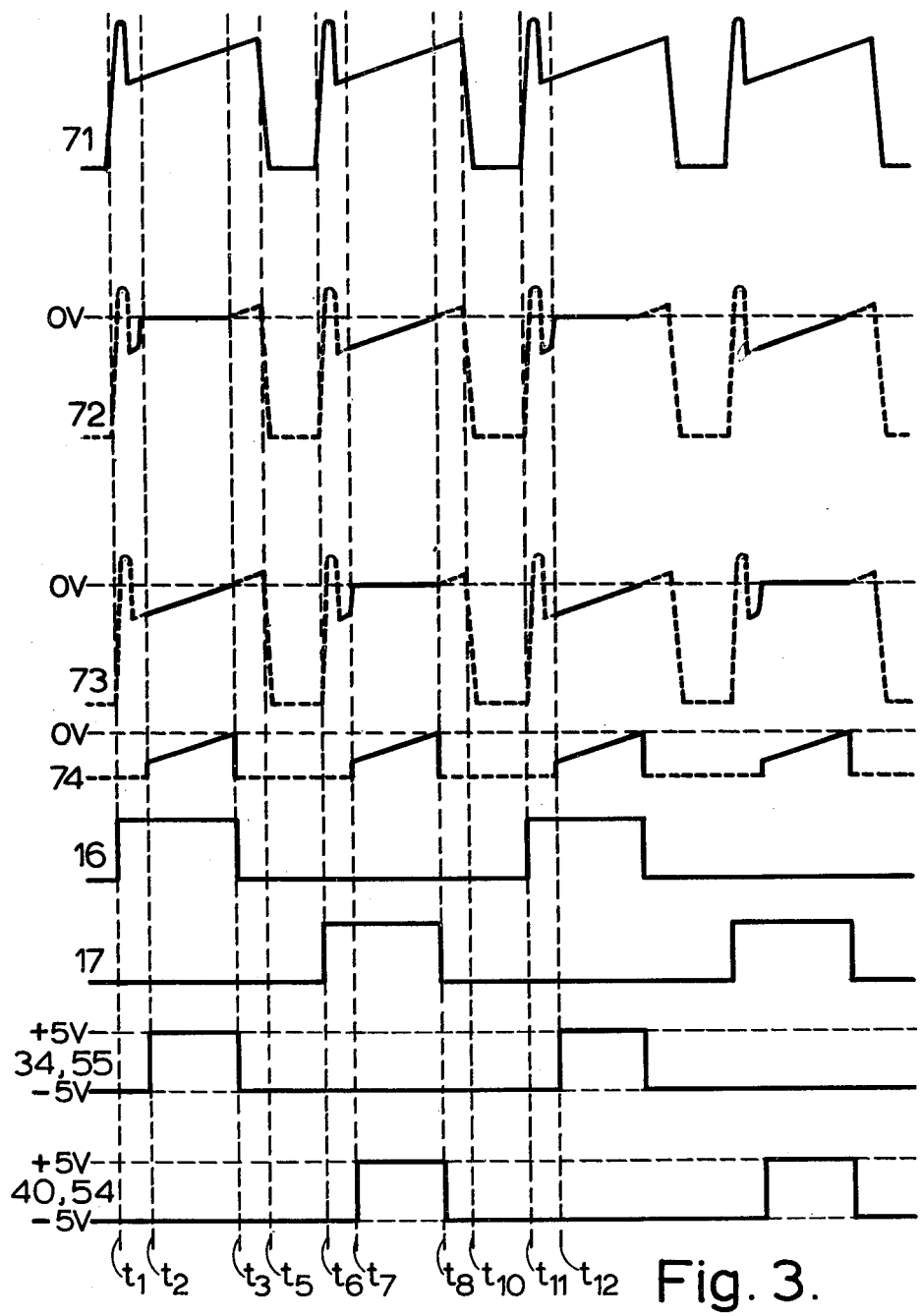
FIGS. 3 and 4 show some idealized waveforms which occur in the circuit of FIGS. 1 and 2.
Figure 4:
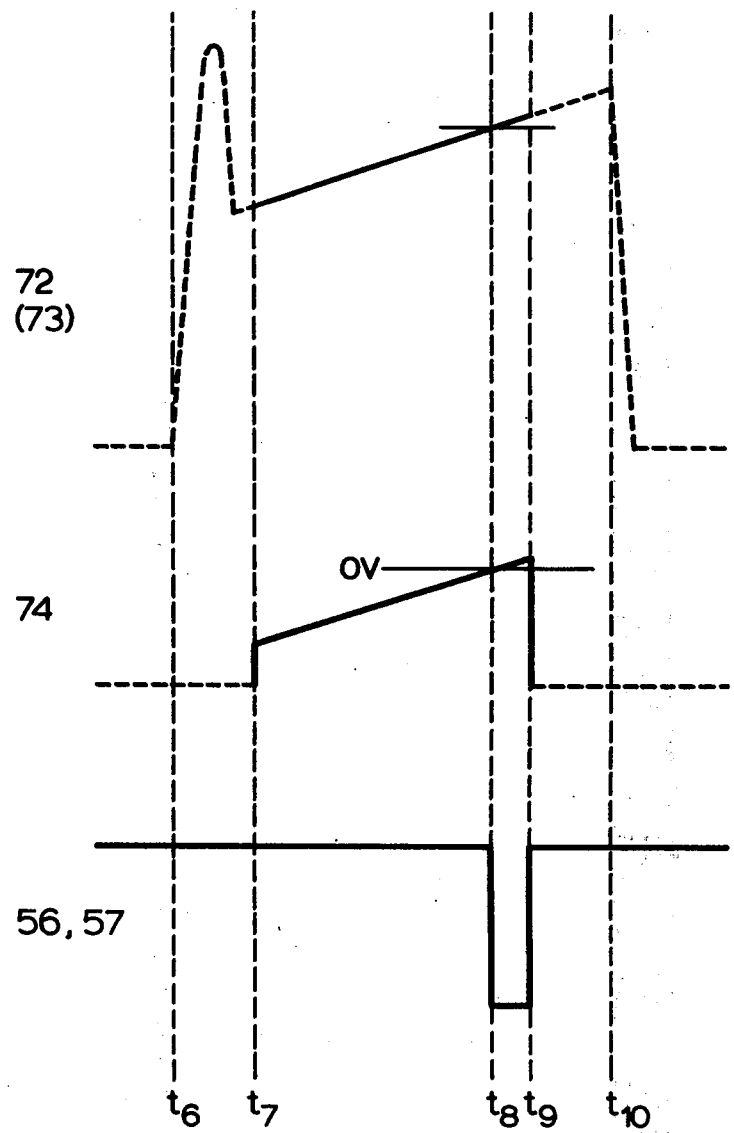

The circuit of FIG. 1 as modified by FIG. 2 operates as follows, various voltage waveforms which may occur therein being shown in FIGS. 3 and 4. In FIGS. 3 and 4 the various waveforms are denoted by the same reference numerals as are the points at which they may occur in FIGS. 1 and 2.

Connection of current transformers 7 and 8 to resistor 62 via diodes 69 and 70 results in the waveform 71 of FIG. 3 appearing at point 71 of FIG. 2, this waveform being the sum of the collector current waveforms of transistors 4 and 5 when the waveforms 16 and 17 respectively of FIG. 3 are applied to their bases. The first and third pulses of waveform 71 correspond to conduction in transistor 4, and the second and fourth pulses thereof correspond to conduction in transistor 5. It will be seen that each pulse comprises an initial turn-on spike 'due to the charging of parasitic capacitance in the collector circuit of the corresponding transistor, followed by a portion comprising a positive going ramp (corresponding to magnetization current of transformer 3) superimposed on a pedestal (corresponding to current drawn from output terminals 14 and 15).

At time $t_2$, i.e. after the occurrence of the turn-on spike of the first pulse of waveform 71, switch 61 is turned on by the output of gate 37 (waveform 34, 55), clamping the lower electrode of capacitor 60 to the zero volt line as shown in the waveform 72 of FIG. 3. The time constant of capacitor 60, resistor 62 and the "on" resistance of switch 61 is arranged to be short (for example 0.1 microsecond) so capacitor 60 is charged rapidly to the voltage across resistor 62 (waveform 71). Switch 61 is kept closed by waveform 34, 55 until time $t_3$ which coincides with the trailing edge of the first pulse of waveform 16, i.e. with the instant at which the drive to transistor 4 is removed, at which instant switch 61 is opened. Because at this instant switch 66 is also open (it is controlled by waveform 40, 54) capacitor 60 remains charged to the value which waveform 71 had at time $t_3$, with the result that waveform 72 then follows waveform 71. At time $t_7$ (which corresponds to time $t_2$ but during the next pulse of waveform 71, which occurs during conduction in transistor 5) switch 66 is closed by the output of gate 47 (waveform 40, 54) so that waveform 74 applied to the inverting input of amplifier 65 becomes identical with waveform 72. At time $t_7$ however the amplitude of waveform 71 is less than it was at time $t_3$, so that waveforms 72 and 74 have a negative value. At this time the input transistor of amplifier 65 is not conducting and this fact, together with the fact that resistor 68 has a high value (for example 10 M ohms) and therefore takes negligible current, means that waveforms 72 and 74 continue to follow waveform 71. When the amplitude of waveform 71 rises to the same value that it had at time $t_3$, the waveforms 72 and 74 rise to zero volts and start to become positive. This occurrence determines time $t_8$. The amplifier 65 has a very high gain and a high input impedance so that, when waveform 74 has become only a few millivolts positive its output 56, 57 goes sharply negative (expanded waveform 56, 57 in FIG. 4), blocking gate 26 a short time $t_9$ (determined by any delays in the circuit) afterwards and hence removing the drive to transistor 5 (waveform 17) and opening switch 64 which was closed at time $t_7$ by the output of gate 47 (waveform 40, 54). The time $t_8$–$t_9$ is arranged to be only a fraction of a microsecond so that $t_8$ and $t_9$ are nearly coincident and transistor 5 therefore has its drive removed when its collector current has a value almost identical to the value which the collector current of transistor 4 had at time $t_3$.

As mentioned previously a finite delay time $t_8$–$t_9$ is necessary in order to allow the transistor currents to increase to satisfy an increased demand at output terminals 14, 15.

After time $t_9$ the information stored in capacitor 60 is no longer required and the cycle of operation is repeated when switch 61 is closed again at time $t_{12}$.

The action of capacitor 63 and switches 64 and 67 is identical to that of capacitor 60 and switches 61 and 66, except that when capacitor 63 is being charged capacitor 60 is connected to amplifier 65, and vice versa. Hence the waveform at point 73 is similar to that at point 72 but is displaced by one half cycle, as shown in FIG. 3.

If desired diodes 75 and 76 may be connected in the circuit of FIG. 2 as shown with their anodes connected to a negative potential point 77. Such diodes can protect the switches from excessive negative voltages at times when the instantaneous value of waveform 71 is zero and limit the effective voltages across capacitors 60 and 63 to any desired value (determined by the potential at point 77). Limitation of the effective voltages across capacitors 60 and 63 in this way will impose an upper limit on the collector currents of transistors 4 and 5, which may be an advantage. Thus for example if a collector current of one amp results in one volt across resistor 62, if the potential at point 77 is −5 volts, and if the forward voltage drops of diodes 75 and 76 are 0.5 volts, the drive to either transistor 4 and 5 will be automatically removed when its collector current reaches 5.5 amps. Such diodes can take the place of the current limit circuit 58 shown in FIG. 1.

In a practical circuit resistor 62 had a value of 50 ohms, capacitors 60 and 63 each had a value of 1000 pF, analogue switches 61, 64, 66 and 67 were together constituted by a quad D-MOS analogue switch avalable from Signetics Corporation under the type number SD5000, and amplifier 65 was a Philips type TCA520B.

What is claimed is:

1. A current-balancing circuit for a direct-voltage converter of the push-pull type comprising, a transformer having a primary winding adapted to be alternately connected to a direct voltage source by means of at least two transistors so that an alternating voltage is obtained in a secondary winding of the transformer, a drive circuit producing pulses for alternately driving the transistors into conduction in a pulsating fashion, current measuring means connected in series with the main current paths of the transistors, a comparison circuit which includes output means which supply correction signals to the drive circuit in the case of inequality of the currents in the main current paths in a manner so as to eliminate said inequality, a first and a second sampling and storage circuit each having a measuring input connected to the current measuring means, a control input connected to the drive circuit, and a measuring output connected to an input of the comparison circuit, and means connecting another input of the comparison circuit to the current measuring means, whereby during each pulse from the drive circuit which causes one of the transistors to conduct one sampling and storage circuit is operative to store the value of the current through the conducting transistor, the final value of the current in the other transistor upon termination of the preceding pulse from the drive circuit being transferred from the measuring output of the other sampling and storage circuit to the comparison circuit which compares said final value with the said value of the current through the conducting transistor and produces an output signal to terminate the existing pulse when the said value of the current exceeds the said final value.

2. A current balancing circuit as claimed in claim 1, wherein the comparison circuit includes a first and a second comparator each having a blocking input connected to the output of a time delay circuit, and means connecting a trigger input of the time delay circuit to the drive circuit for blocking a comparator during the beginning of each drive pulse for the transistors.

3. A current balancing circuit as claimed in claim 2, characterized in that the control input of the sampling and storage circuit is connected to said drive circuit via the time delay circuit.

4. A current balancing circuit as claimed in claim 2 wherein the drive circuit includes a clock pulse generator which supplies basic pulses from which the drive pulses for the transistors are derived, characterized in that the control input of a sampling and storage circuit is connected to the drive circuit via an OR-gate having an output connected to said control input and a first input connected to the output of the time delay circuit and a second input connected to a pulse generator circuit which has a blocking input connected to said trigger input and a start input connected to the clock pulse generator, whereby a sampling pulse is only supplied to said control input in the absence of a control pulse during a basic pulse.

5. A current balancing circuit as claimed in claim 1 wherein the comparison circuit includes one common comparator having a pair of blocking inputs connected to the output of a time delay circuit, means connecting a trigger input of the time delay circuit to the drive circuit, and the first and second sampling and storage circuits each comprise a series connection of a capacitor and a switch having a control electrode, which series connection is connected across the sampling and storage circuit measuring input, the control electrode of the switch being the respective control input and the junction point of the switch and capacitor being the respective measuring output, the measuring inputs being connected in parallel with each other and to a common current measuring means, the one common comparator further comprising a differential amplifier and two further switches each having a control electrode, the output of the amplifier being connected to a control input of the drive circuit, one input of the amplifier being connected to one terminal of each of the two further switches, the other terminal of each of said two further switches being connected to a said respective measuring output, and the control electrode of each further switch being connected to a respective blocking input, and a second input of the amplifier is connected to a common line which connects the measuring inputs and to which the first-mentioned switches are connected.

6. A current balancing circuit as claimed in claim 5 further comprising means connecting each measuring output via a clamping diode to a reference potential which corresponds to a maximum permissible current in the transistors.

* * * * *